US012011820B2

(12) United States Patent
Moss et al.

(10) Patent No.: US 12,011,820 B2
(45) Date of Patent: Jun. 18, 2024

(54) POWER TOOL AND TOOL BIT HOLDING SYSTEM

(71) Applicant: Black & Decker Inc., New Britain, CT (US)

(72) Inventors: Darren Moss, York, PA (US); Aland Santamarina, Woodbine, MD (US)

(73) Assignee: BLACK & DECKER INC., New Britain, CT (US)

( * ) Notice: Subject to any disclaimer, the term of this patent is extended or adjusted under 35 U.S.C. 154(b) by 620 days.

(21) Appl. No.: 17/163,956

(22) Filed: Feb. 1, 2021

(65) Prior Publication Data

US 2021/0237253 A1 Aug. 5, 2021

Related U.S. Application Data

(60) Provisional application No. 62/969,822, filed on Feb. 4, 2020.

(51) Int. Cl.
*B25F 5/02* (2006.01)
*B25B 21/00* (2006.01)

(52) U.S. Cl.
CPC .............. *B25F 5/029* (2013.01); *B25B 21/00* (2013.01)

(58) Field of Classification Search
CPC ....... B25B 21/00; B25B 21/007; B25F 5/021; B25F 5/029; B25H 3/00; B25H 3/003; B25H 3/006
USPC .................................................. 206/349, 379
See application file for complete search history.

(56) References Cited

U.S. PATENT DOCUMENTS

| | | | |
|---|---|---|---|
| 1,808,228 | A | 6/1931 | Eugene et al. |
| 1,898,956 | A | 2/1933 | Eldridge |
| 2,256,779 | A | 9/1941 | Gail |
| 2,256,799 | A | 9/1941 | Avery |
| 2,319,973 | A | 5/1943 | Loren |

(Continued)

FOREIGN PATENT DOCUMENTS

| | | | |
|---|---|---|---|
| AT | 410065 | B | 1/2003 |
| CH | 666207 | A5 | 7/1988 |

(Continued)

OTHER PUBLICATIONS

European Search Report for EP Application No. 15 17 8011 dated Jan. 5, 2016, 8 pages.

(Continued)

*Primary Examiner* — Bryon P Gehman
(74) *Attorney, Agent, or Firm* — Scott B. Markow

(57) ABSTRACT

A tool bit holding system for a power tool includes a snap-on bit holder including a curved plate contoured similar to a contour of a top surface of a power tool housing and configured to removably rest on the top of the power tool housing. A plurality of legs extend from lateral ends of the curved plate, each leg including a hook portion configured to be removably received in recesses in lateral sides of the power tool housing to removably retain the curved plate on the top surface of the power tool housing. A bit holding portion includes at least one of a magnetic plate, a box, and one or more bit receiving slots coupled to a top face of the curved plate. The at least one of the magnetic plate, the box, and the one or more bit receiving slots is configured to removably retain at least one of a tool bit, a fastener, and a supplemental tool bit holder.

16 Claims, 18 Drawing Sheets

(56) References Cited

U.S. PATENT DOCUMENTS 2,387,411 A 10/1945 Schmidt
2,457,829 A 1/1949 Miller
2,504,880 A 4/1950 Charles
2,544,461 A 3/1951 Leitzel
2,621,685 A 12/1952 Butz
2,625,964 A 1/1953 Green et al.
2,631,619 A 3/1953 Folli
2,635,335 A 4/1953 James
2,696,129 A 12/1954 Riblet
2,710,632 A 6/1955 Richter
2,714,905 A 8/1955 Clayton
2,760,265 A 8/1956 Draenert
2,787,265 A 4/1957 Neidt
2,788,810 A 4/1957 Jones
2,793,661 A 5/1957 Olson
2,822,005 A 2/1958 Lee et al.
2,840,904 A 7/1958 Hutchins
2,906,304 A 9/1959 Levine
2,982,320 A 5/1961 Trumbull et al.
2,990,024 A 6/1961 Van Allsburg
3,006,390 A 10/1961 Draenert
3,025,599 A 3/1962 Sauers et al.
3,046,817 A 7/1962 Schwable
3,077,129 A 2/1963 Carles
D197,987 S 4/1964 Docken
3,130,759 A 4/1964 Mohr
3,260,289 A 7/1966 Whitten
3,585,719 A 6/1971 Kivela
3,654,700 A 4/1972 Pawloski
3,768,363 A 10/1973 Tackett et al.
3,876,015 A 4/1975 Kivela
3,940,852 A 3/1976 Ruf et al.
4,173,069 A 11/1979 Sidenstick et al.
4,312,610 A 1/1982 Burt
4,317,282 A 3/1982 Pace
4,381,605 A 5/1983 Holm
4,477,213 A 10/1984 Nelson et al.
4,682,416 A 7/1987 Stolfa
4,712,983 A 12/1987 Moynihan
4,748,744 A 6/1988 Turner
4,841,643 A 6/1989 Colella et al.
5,056,661 A 10/1991 Balzano
5,188,242 A 2/1993 Smith
5,224,231 A 7/1993 Nacar
5,224,803 A 7/1993 Lallier
5,239,758 A 8/1993 Lindell
5,371,947 A 12/1994 Dickey et al.
5,409,243 A 4/1995 Shadeck et al.
5,445,480 A 8/1995 Merriman
5,465,983 A 11/1995 Owens et al.
5,555,780 A 9/1996 Beach et al.
5,566,768 A 10/1996 Bourke
5,595,250 A 1/1997 Bourke
5,607,265 A 3/1997 Lane
5,755,293 A 5/1998 Bourke
5,765,839 A 6/1998 Roehm
5,901,447 A 5/1999 Dunning
5,992,024 A 11/1999 Rogers
6,178,643 B1 1/2001 Erbrick et al.
6,220,074 B1 4/2001 Montminy et al.
6,264,211 B1 7/2001 Granado
6,401,253 B2 6/2002 Brunson
6,496,094 B2 12/2002 May
6,651,348 B1 11/2003 Steinmann
D487,386 S 3/2004 Clivio
6,712,368 B2 3/2004 Bohn et al.
D488,695 S 4/2004 Peterson
6,776,150 B2 8/2004 Gaidjiergis et al.
6,820,339 B2 11/2004 Albrightson
6,860,488 B2 3/2005 Mack
D512,623 S 12/2005 Huang
D513,953 S 1/2006 Peterson
7,093,365 B2 8/2006 Peterson
7,108,079 B2 * 9/2006 Sakai ...................... B25F 5/029 173/217
D538,126 S 3/2007 Aglassinger
7,293,362 B2 11/2007 Konen
D559,647 S 1/2008 Watson
D564,981 S 3/2008 Johnson
D564,982 S 3/2008 Johnson
D564,983 S 3/2008 Johnson
D566,061 S 4/2008 Johnson
7,464,473 B2 12/2008 Fladgard et al.
7,513,048 B2 4/2009 De
D593,389 S 6/2009 Clayton
7,591,616 B1 9/2009 Kerner
7,621,396 B1 11/2009 Flores
7,891,101 B2 2/2011 Brady
7,971,360 B2 7/2011 Clark et al.
7,984,556 B2 7/2011 Konen
8,047,100 B2 11/2011 King
8,066,268 B2 11/2011 Brauer et al.
8,191,268 B2 6/2012 Willetts
8,209,830 B1 7/2012 Crespo
8,342,001 B2 1/2013 Zhang
8,434,219 B2 5/2013 Dierks et al.
8,479,354 B1 7/2013 Doyle
D719,806 S 12/2014 Wiedemann
8,919,787 B1 12/2014 Wilcher
D730,141 S 5/2015 Moss et al.
9,227,240 B2 1/2016 MacAdams
9,388,885 B2 7/2016 Hartranft et al.
9,573,197 B1 2/2017 Stephenson
9,649,702 B2 5/2017 Batho et al.
9,701,008 B2 7/2017 Cho
9,701,032 B2 7/2017 Moss et al.
9,878,440 B2 1/2018 Da Rosa
10,131,048 B2 11/2018 Gerber et al.
10,293,471 B2 5/2019 Wong
10,315,256 B1 6/2019 Stephenson
2002/0122707 A1 * 9/2002 Sakai ...................... B25F 5/029 224/268
2004/0191021 A1 9/2004 Breitenmoser
2004/0206649 A1 10/2004 Chen
2005/0028391 A1 2/2005 Peterson
2006/0104735 A1 * 5/2006 Zeiler ..................... B25F 5/029 173/217
2006/0112566 A1 6/2006 Peterson et al.
2007/0059114 A1 3/2007 Grimes
2007/0175785 A1 8/2007 Sharp
2008/0222898 A1 9/2008 Staples
2011/0062296 A1 3/2011 Brauer et al.
2011/0219626 A1 9/2011 Broeker et al.
2013/0112445 A1 5/2013 Drako
2013/0213683 A1 8/2013 Brewster et al.
2014/0182137 A1 7/2014 Liu et al.
2014/0260831 A1 9/2014 Hays et al.
2016/0039019 A1 2/2016 Bublitz et al.
2016/0114471 A1 4/2016 Wong
2016/0150738 A1 6/2016 Hall
2016/0221200 A1 8/2016 Winkel et al.
2016/0268068 A1 9/2016 Chiasson et al.
2016/0271781 A1 9/2016 Kobayashi et al.
2016/0375510 A1 12/2016 Batho et al.
2017/0021488 A1 1/2017 Gerber et al.
2019/0030702 A1 1/2019 Gerber et al.
2019/0084146 A1 * 3/2019 Boltryk .................. B25H 3/003
2020/0055176 A1 * 2/2020 Curchod ................. B25F 5/029

FOREIGN PATENT DOCUMENTS

DE 899746 C 9/1954
DE 2515839 A1 10/1976
DE 2603482 A1 8/1977
DE 3015532 A1 10/1981
DE 3627689 A1 2/1988
EP 2977155 A1 1/2016
FR 2278455 A1 2/1976
FR 2325452 A1 4/1977
FR 2502550 A1 10/1982
FR 2505237 A1 11/1982
FR 2981873 A1 5/2013
JP 57-075709 5/1982

(56) References Cited

FOREIGN PATENT DOCUMENTS

| | | | |
|---|---|---|---|
| JP | 2001315069 | A | 11/2001 |
| JP | 2004121585 | A | 4/2004 |
| JP | 4676604 | B2 | 2/2011 |

OTHER PUBLICATIONS

European Search Report for EP Application No. 21 15 4907 dated Jul. 14, 2021, 5 pages.

* cited by examiner

POWER TOOL AND TOOL BIT HOLDING SYSTEM

RELATED APPLICATION

This application claims priority, under 35 U.S.C. § 119(e) to U.S. Provisional Application No. 62/969,822, filed Feb. 4, 2020, titled "Bit Holders for Power Tools," which is incorporated by reference.

TECHNICAL FIELD

This application relates to a bit holder system for power tools and to a power tool and bit holding system.

BACKGROUND

Users of power tools for fastening, such as drills, drill drivers, screwdrivers, impact drivers, and impact wrenches, use a variety of fastening bits.

SUMMARY

In an aspect, a variety of bit holders may be removably attachable to the housing of a power tool, such as a drill, drill driver, screwdriver, impact driver or impact wrench. The bit holder may retain one or more fastening bits or tool bit holders such as Phillips bits, flat head bits, star bits, Torx bits, drive guides, and quick release bit holders. The bit holders may be removably coupled to the power tool, e.g., on the top of the motor housing, on the base of the handle, or on the front of the tool. The bit holder may include one or more magnetic surfaces or recesses configured to removably retain one or more fastening bits. The bit holders also may be used to hold or retain other accessories such as drill bits, saw blades, fasteners, and nails.

In another aspect, a tool bit holding system for a power tool includes a snap-on bit holder including a curved plate contoured similar to a contour of a top surface of a power tool housing and configured to removably rest on the top of the power tool housing. A plurality of legs extend from lateral ends of the curved plate, each leg including a hook portion configured to be removably received in recesses (e.g., air vents) in lateral sides of the power tool housing to removably retain the curved plate on the top surface of the power tool housing. A bit holding portion includes at least one of a magnetic plate, a box, and one or more bit receiving slots coupled to a top face of the curved plate. The at least one of the magnetic plate, the box, and the one or more bit receiving slots is configured to removably retain at least one of a tool bit, a fastener, and a supplemental tool bit holder.

Implementations of this aspect may include one or more of the following features. The curved plate may include a semi-rigid member. Each leg may extend laterally outward from the curved plate. Each hook portion may include an L-shaped member. The bit holding portion may include the magnetic plate. The bit holding portion may include the slot extending generally parallel to a tool axis. The bit holding portion may include the box with a door configured to be moved between a closed position and an open position. The bit holding portion may include the slot extending generally parallel to a tool axis. A secondary bit holder including a bar with a plurality of bit receiving openings may be configured to be removably coupled to a base of a handle that extends from the power tool housing. The secondary bit holder may be coupled to the base by a threaded fastener received through a hole in the bit bar and into a threaded bore in the base. The threaded fastener and threaded bore may be configured to alternatively couple a belt clip to the base in place of the bit bar. The bit bar may include a drop down extension including a recess configured to receive a supplemental tool holder.

In another aspect, a power tool and tool bit holding system includes a power tool and a snap-on bit holder. The power tool include a housing having a top surface and lateral sides, a motor received in the housing, an output member extending at least partially from the housing, and a plurality of recesses (e.g., air vents) formed in the lateral sides of the housing. The snap-on bit holder includes a curved plate contoured similar to a contour of the top surface of a power tool housing and configured to removably rest on the top surface of the power tool housing. A plurality of legs extend from lateral ends of the curved plate. Each leg includes a hook portion configured to be removably received in the recesses (e.g., air vents) in lateral sides of the power tool housing to removably retain the curved plate on the top of the power tool housing. A bit holding portion includes at least one of a magnetic plate, a box, and one or more bit receiving slots coupled to a top face of the curved plate. The at least one of the magnetic plate, the box, and the one or more bit receiving slots is configured to removably retain at least one of a tool bit, a fastener, and a supplemental tool bit holder.

Implementations of this aspect may include one or more of the following features. The curved plate may include a semi-rigid member. Each leg may extend laterally outward from the curved plate. Each hook portion may include an L-shaped member. The bit holding portion may include the magnetic plate. The bit holding portion may include the slot extending generally parallel to a tool axis. The bit holding portion may include the box with a door configured to be moved between a closed position and an open position. The bit holding portion may include the slot extending generally parallel to a tool axis. A secondary bit holder including a bar with a plurality of bit receiving openings may be configured to be removably coupled to a base of a handle that extends from the power tool housing. The secondary bit holder may be coupled to the base by a threaded fastener received through a hole in the bit bar and into a threaded bore in the base. The threaded fastener and threaded bore may be configured to alternatively couple a belt clip to the base in place of the bit bar. The bit bar may include a drop down extension including a recess configured to receive a supplemental tool holder.

The power tool may include a handle having a proximal portion coupled to the housing and a base disposed away from the housing. The system may include a secondary bit holder having a bar with a plurality of bit receiving openings configured to be removably coupled to the base of the handle by a first threaded fastener received through a first hole in the bit bar and into a first threaded bore in the base. The threaded fastener and threaded bore may be configured to alternatively couple a belt clip to the base in place of the bit bar. A belt clip may be removably couplable to the base on an opposite side of the base from the secondary bit holder. The belt clip may removably coupleable to the base by a second threaded fastener received through a second hole in the belt clip and into a second threaded bore in the opposite side of the base.

In another aspect, a tool bit holding system for a power tool includes an elongated front bit holder having a top end portion and a bottom end portion and configured to removably retain at least one of a tool bit, a fastener, and a supplemental tool bit holder. A top support bracket is coupled to the top end portion and configured to be removably coupled to a nosepiece portion of the power tool to support the elongated front bit holder. A bottom support bracket is coupled to the bottom end portion and configured to be removably coupled to a base of the power tool to support the elongated front bit holder.

Implementations of this aspect may include one or more of the following features. The elongated front bit holder may include an elongated receptacle configured to receive a plurality of tool bits. The elongated front bit holder further may include a plunger received in the elongated receptacle. The plunger may be biased toward the top end portion of the elongated front bit holder. A top of the receptacle may include a lateral opening configured to allow for dispensing a tool bit from the receptacle. The elongated front bit holder may include a magnetic surface configured to magnetically retain the at least one of a tool bit, a fastener, and a supplemental tool bit holder. The top support bracket may include a hook configured to be received around the nosepiece. The bottom support bracket may include an angle bracket and a bar disposed on a lateral side of the base. The bar may include a hole, the bar being configured to be coupled to the base of the power tool by a fastener received through the hole into a threaded bore in the base. The threaded fastener and threaded bore may be configured to alternatively couple a belt clip to the base in place of the bar.

Advantages may include enabling the user to hold tool bits close to the tool without using another hand to facilitate quick changing of tool bits. These and other advantages and features will be apparent from the description and the drawings. These and other implementations are within the scope of this application.

DETAILED DESCRIPTION OF THE DRAWINGS

Figure 1A:
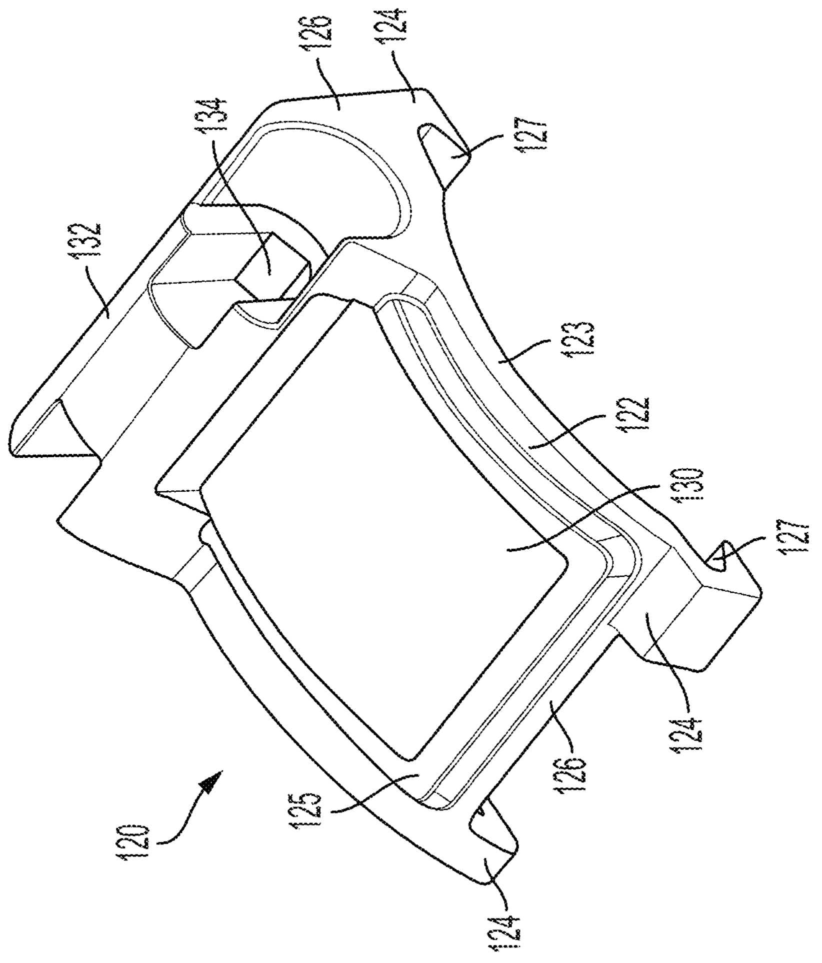
FIGS. 1A-1D are perspective views of an implementation of a power tool and bit holding system.
Figure 1D:
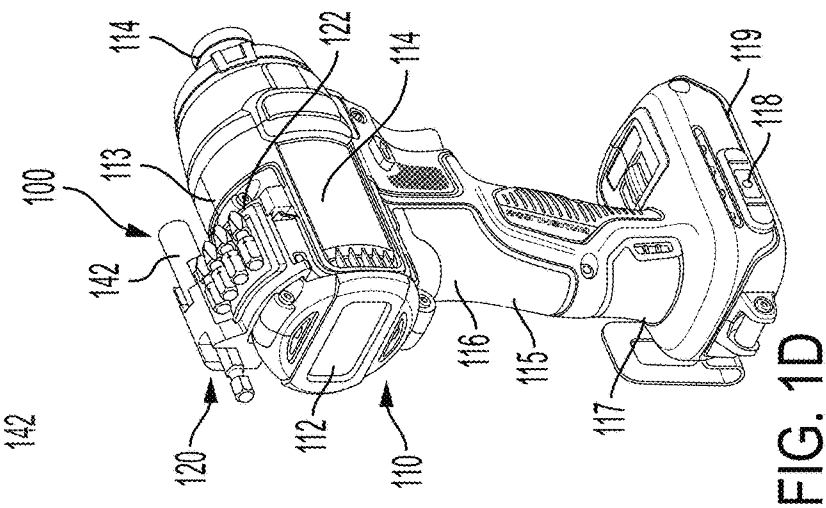
Figure 1B:
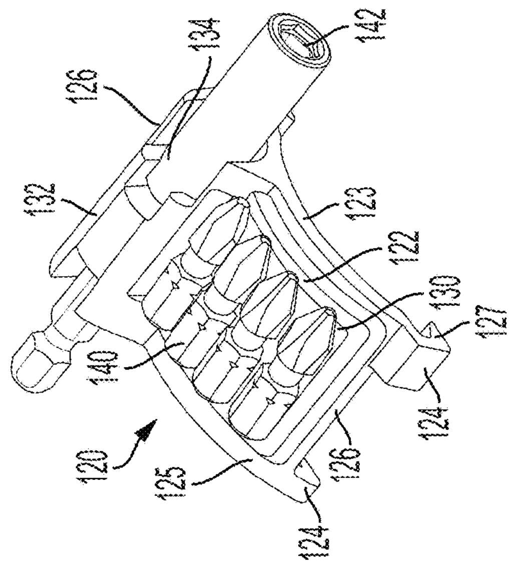
Figure 1C:
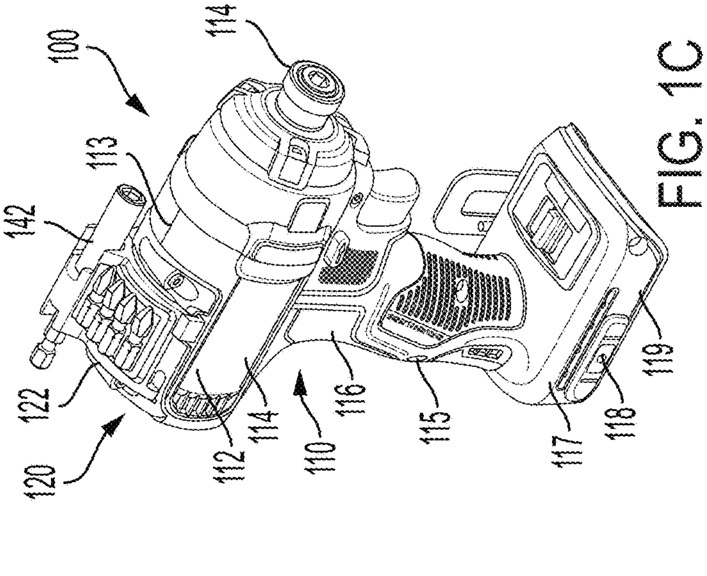

FIGS. 1A-1D illustrate an implementation of a power tool and bit holding system 100 including a power tool 110 and a snap-on bit holder 120. The power tool includes a tool housing 112 having a top surface 113 and lateral sides 114. A motor (not shown) is received in the tool housing 112. An output member 114 (e.g., a chuck or tool bit holder) extends at least partially from the tool housing 112 and is configured to be driven by the motor. A handle 115 extends from the tool housing 112 and includes a proximal portion 116 coupled to the housing 112 and a base 117 (e.g., a battery receptacle) disposed away from the housing 112. First and second threaded bores 118 are defined in opposite lateral sides 119 of the base 117.

The snap-on bit holder 120 includes a curved plate 122 having a bottom surface 123 contoured (e.g., concave) similar to a contour (e.g., convex) of the top surface 113 of the tool housing 112 and configured to removably rest on the top surface 113 of the tool housing 112. A plurality of legs 124 extend from lateral ends 126 of the curved plate 122. At least two of the legs 124 include an L-shaped or curved hook portion 127 configured to be removably received in air vents or recesses 128 in the lateral sides 114 of the power tool housing 112 to removably retain the curved plate 122 on the top of the power tool housing. The snap on bit holder 120 includes a top surface 125 including a magnetic plate 130 configured to removably retain one or more tool bits 140, fasteners, and/or supplemental tool bit holders. The top surface 125 also includes a boss 132 with one or more cylindrical recesses or bit receiving slots 134 that are configured to removably retain one or more of a supplemental bit holder 142 (e.g., a drive guide as shown), a tool bit, and/or a fastener. The curved plate 122 may be composed of a semi-rigid material, such as sheet metal or a semi-rigid plastic. The snap-on bit holder 120 may be removably coupled to the power tool housing by flexing the curved plate and snapping the hook portions 127 into the air vents or recesses 128 in the lateral sides of the power tool housing 112. In alternative or additional implementations, the snap on bit-holder may be attached by to the power tool housing other fasteners such as screws, loops, or straps.

Figure 1E:
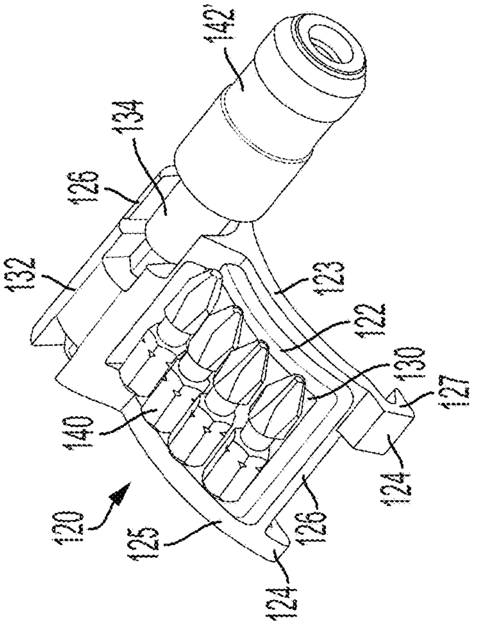
FIGS. 1E-1G are perspective views of another implementation of a power tool and bit holding system.
Figure 1G:
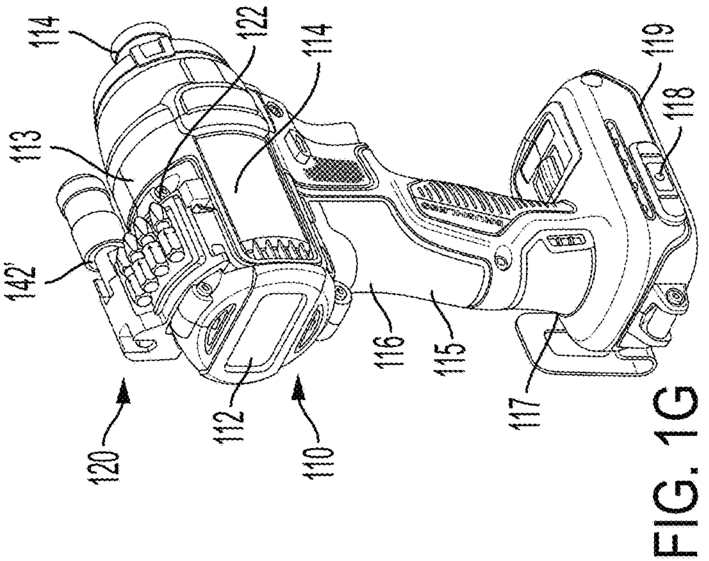
Figure 1F:
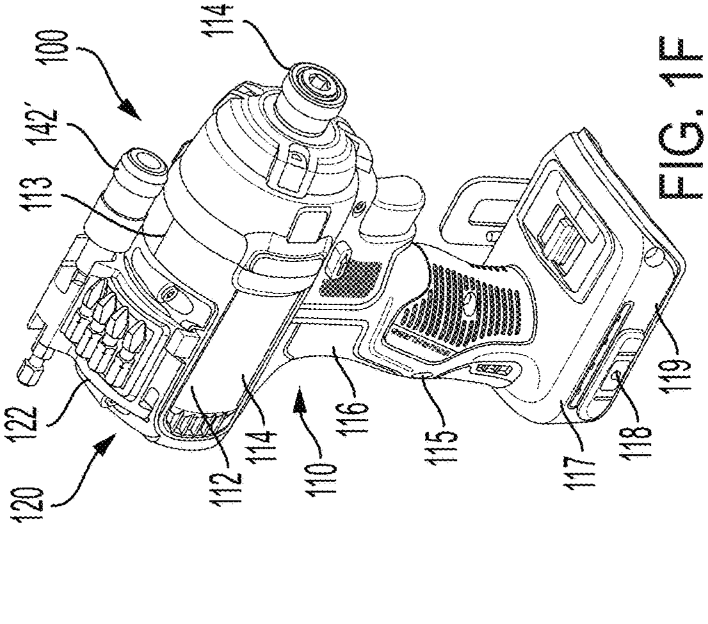

FIGS. 1E-1G illustrate another implementation of the power tool and bit holding system 100 with a different type of supplemental bit holder 142' (e.g., a quick release bit holder) releasably retained in the cylindrical recess or bit receiving slot 134 in the snap-on bit holder 120.

Figure 2B:
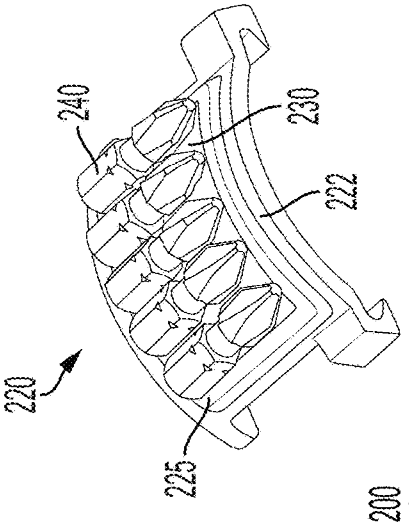
FIGS. 2A-2C are perspective views of another implementation of a power tool and bit holding system.
Figure 2C:
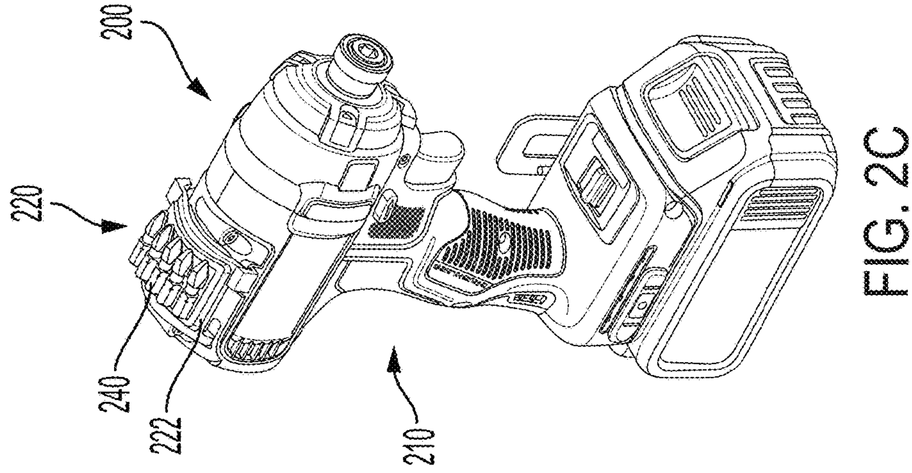
Figure 2A:
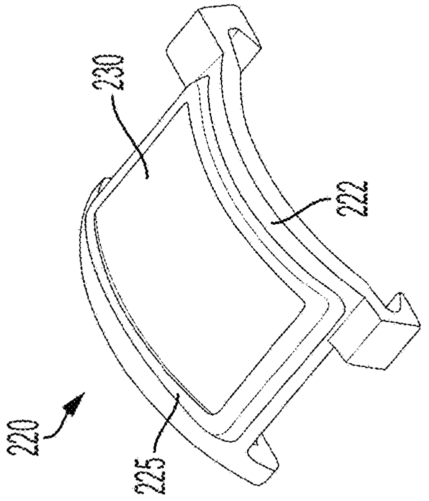

FIGS. 2A-2C illustrate another implementation of a power tool and bit holding system 200 including a power tool 210 and a snap-on bit holder 220. The power tool 210 is substantially the same as the power tool 110 of the system 100 in FIGS. 1A-1D. The snap-on bit holder 220 is substantially the same as the snap-on bit holder 120 of the system in FIGS. 1A-1D except for the following differences. The snap-on bit holder 220 includes a curved plate 222 with a top surface 225 having a magnetic plate 230 configured to removably retain one or more tool bits 240, fasteners, and/or supplemental tool bit holders, but with no boss, cylindrical recesses, or bit receiving slots configured to removably retain one or more of a supplemental bit holder, a tool bit, and/or a fastener. The remaining features of the snap-on bit holder 220 are substantially similar to the snap-on bit holder 110.

FIGS. 3A-3H illustrate another implementation of a power tool and bit holding system 300 including a power tool 310 and a snap-on bit holder 320. The power tool 310 is substantially the same as the power tool 110 of the system 100 in FIGS. 1A-1D. The snap-on bit holder 320 includes a curved plate 322 having a bottom surface 323 contoured (e.g., concave) similar to a contour (e.g., convex) of a top surface 313 of a tool housing 312 of the power tool 310 and configured to removably rest on the top surface 313 of the tool housing 312. A plurality of legs 324 extend from lateral ends 326 of the curved plate 322. At least two of the legs 324 include an L-shaped or curved hook portion 327 configured to be removably received in air vents or recesses in lateral sides 314 of the power tool housing 312 to removably retain the curved plate 322 on the top of the power tool housing.

Figure 3B:
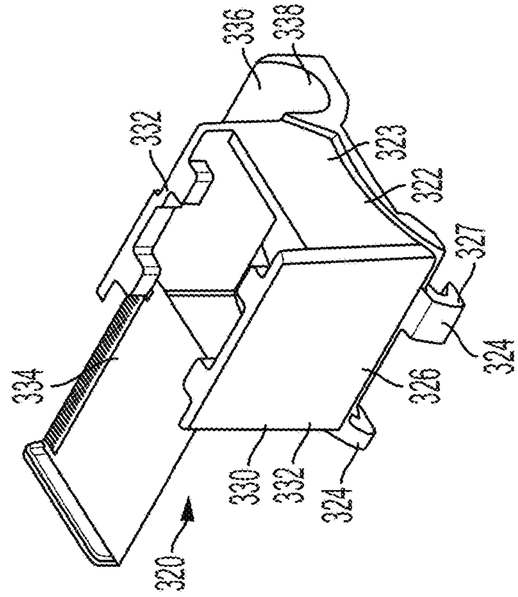
FIGS. 3A-3H are perspective views of another implementation of a power tool and bit holding system.
Figure 3D:
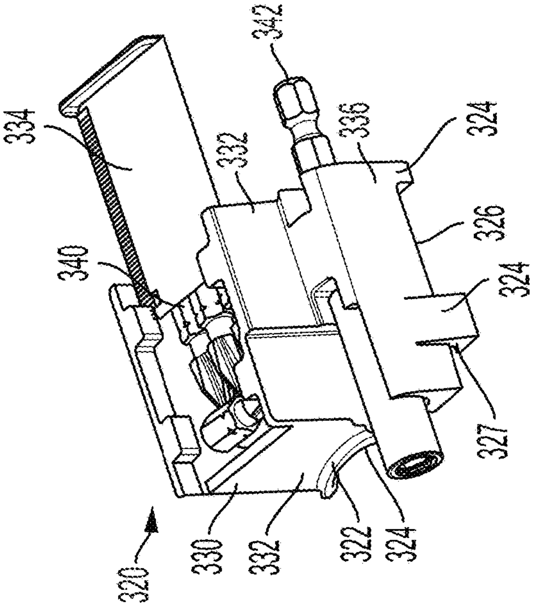
Figure 3A:
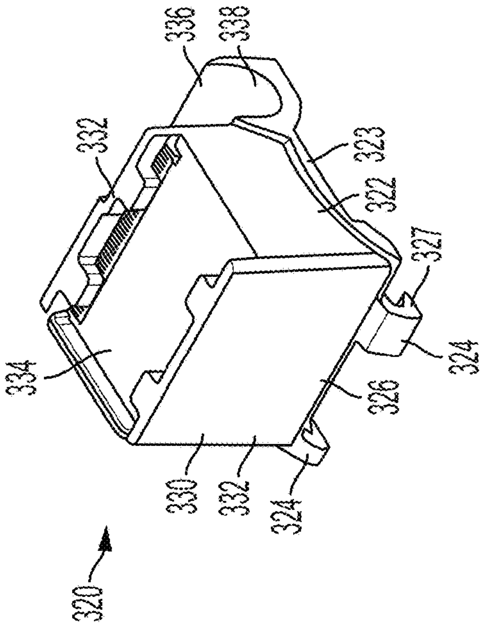
Figure 3C:
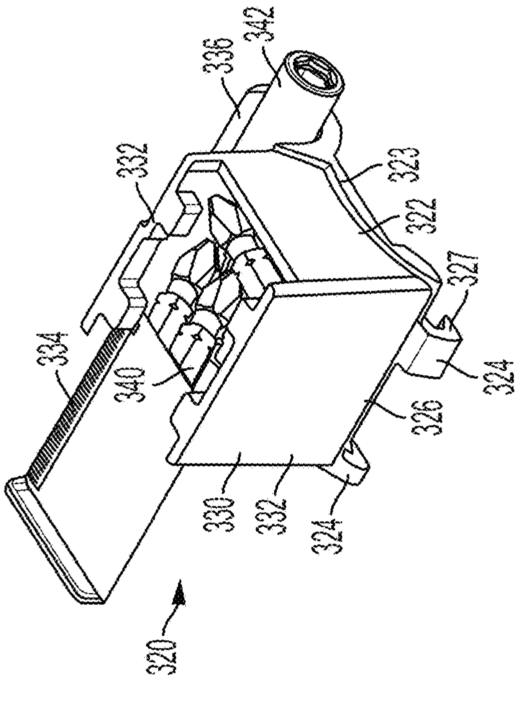
Figure 3F:
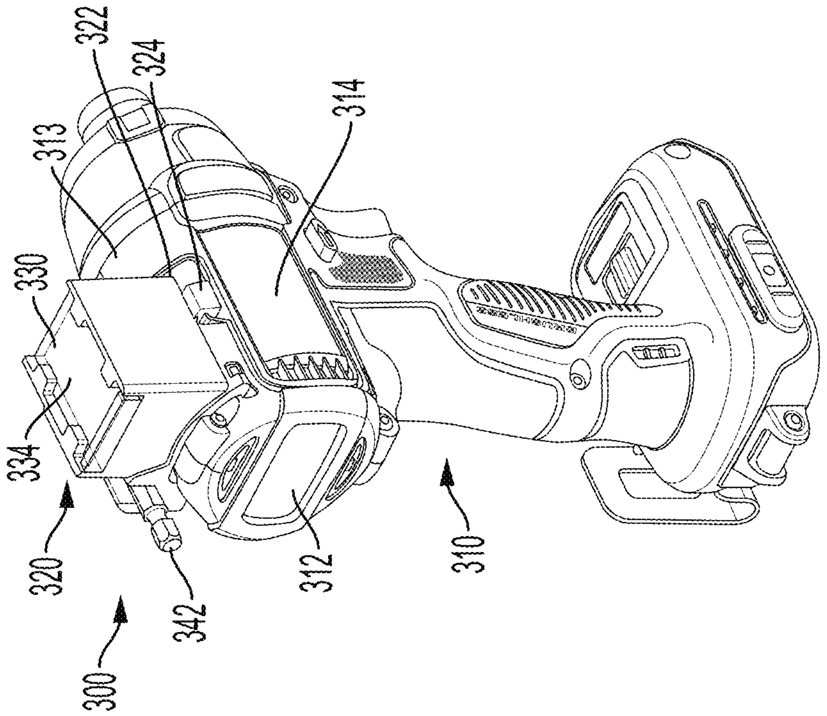
Figure 3E:
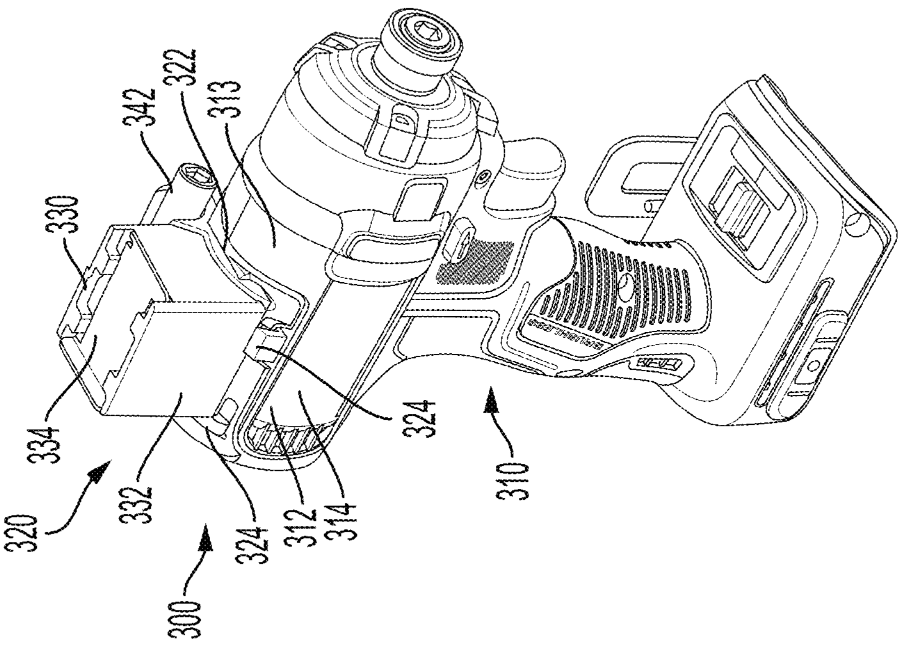
Figure 3H:
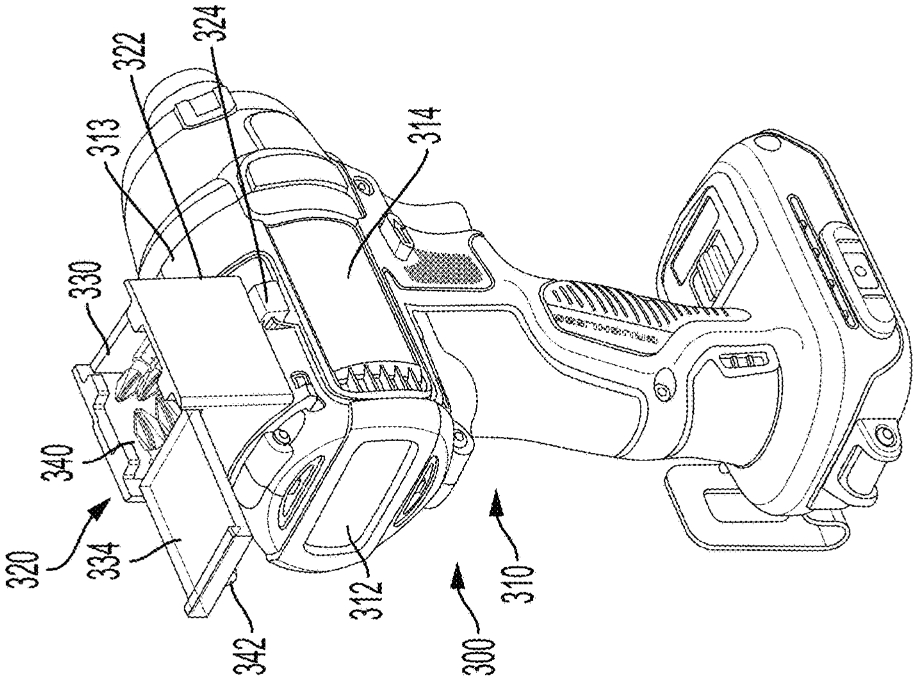
Figure 3G:
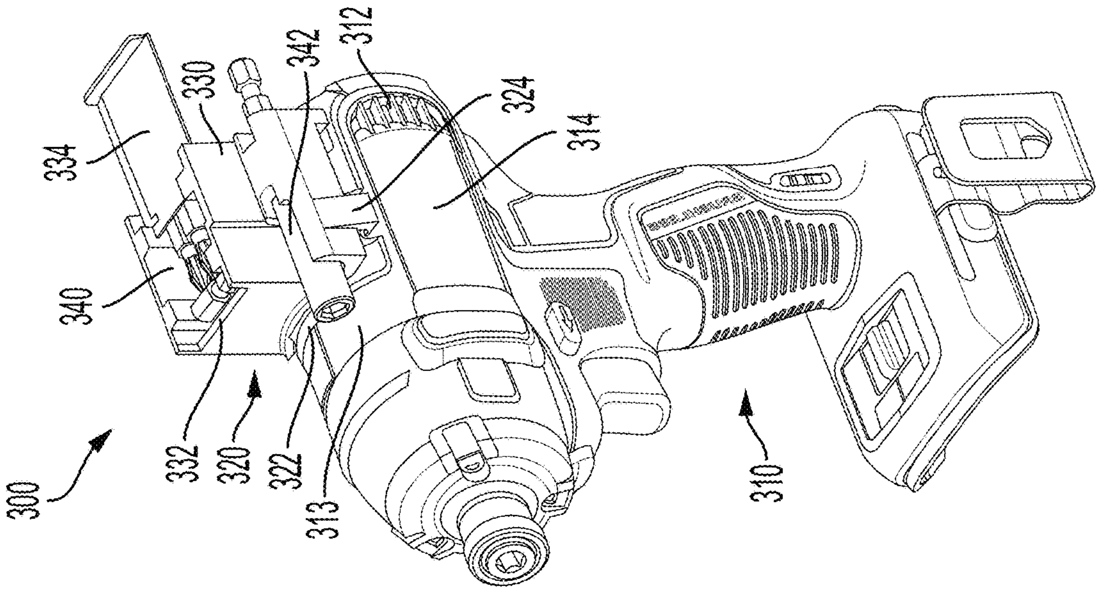

The snap-on bit holder 320 includes a bit holding box 330 (e.g., a rectangular box) integrally formed with the curved plate 322. The box 330 includes a plurality of sidewalls 332 and a cover or door 334 moveable between a closed position (as shown in FIG. 3A) and an open position (as shown in FIG. 3B), e.g., by sliding or pivoting the cover 334. The box 330 is configured to removably retain one or more tool bits 340, fasteners, and/or supplemental tool bit holders. The box 330 may be configured to include an interior magnetic surface. The curved plate 322 also includes a boss 336 with one or more cylindrical recesses or bit receiving slots 338 that are configured to removably retain one or more of a supplemental bit holder 342 (e.g., a drive guide as shown), a tool bit, and/or a fastener. The curved plate 322 may be composed of a semi-rigid material, such as sheet metal or a semi-rigid plastic. The snap-on bit holder 320 may be removably coupled to the power tool housing by flexing the curved plate and snapping the hook portions 327 into the air vents or recesses in the lateral sides of the power tool housing 312. In alternative or additional implementations, the snap on bit-holder may be attached by to the power tool housing other fasteners such as screws, loops, or straps.

Figure 4A:
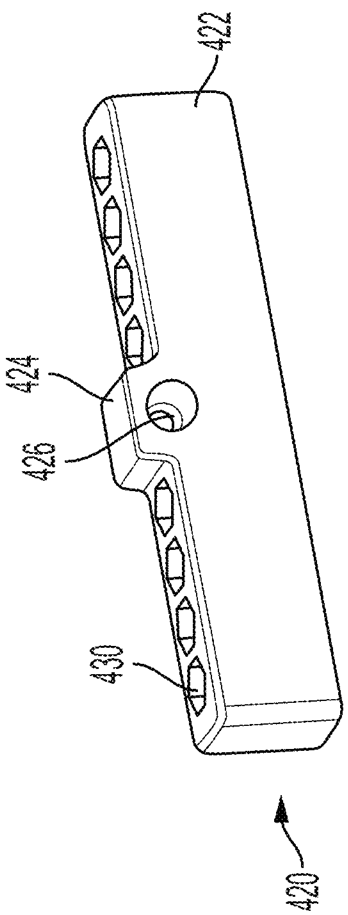
FIGS. 4A-4D are perspective views of another implementation of a power tool and bit holding system.
Figure 4B:
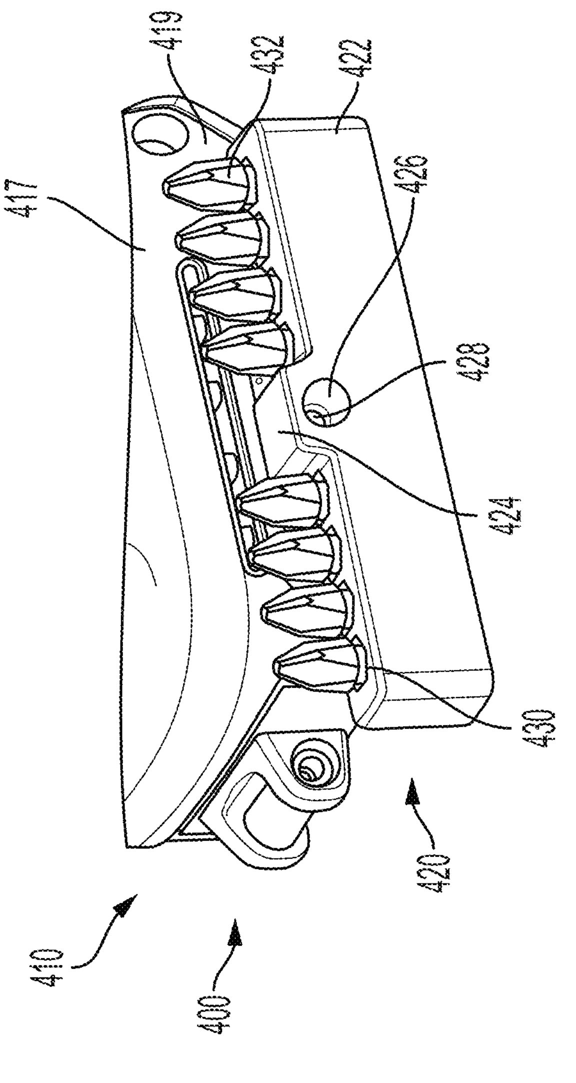
Figure 4D:
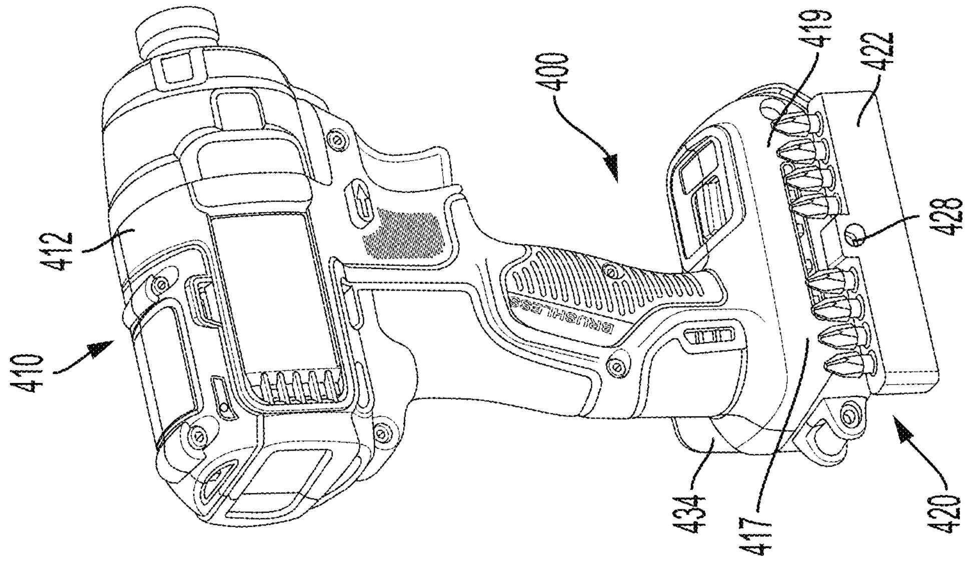
Figure 4C:
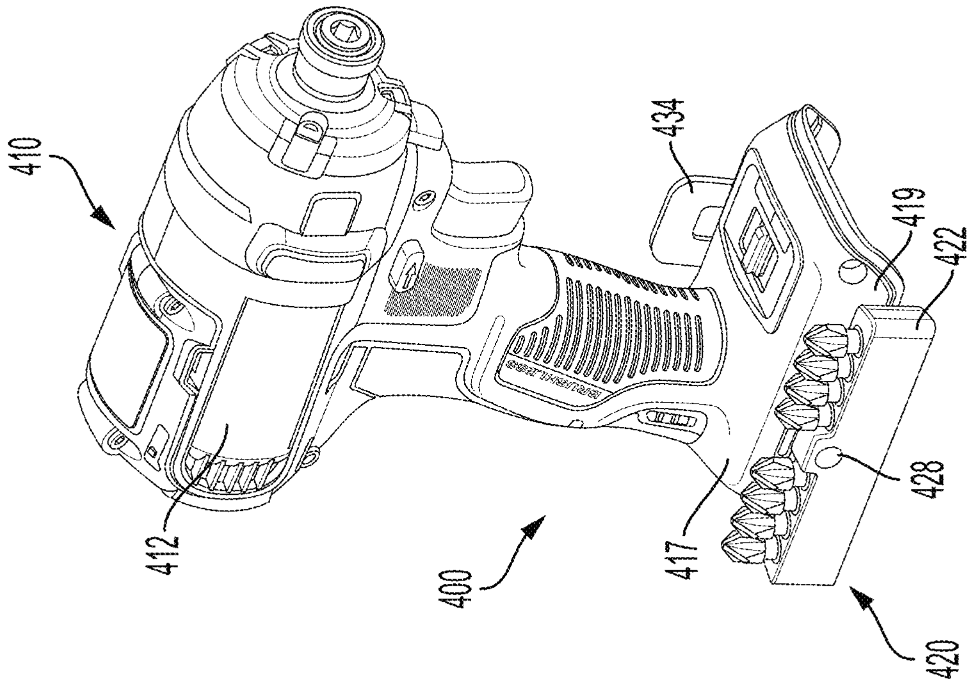

FIGS. 4A-4D illustrate another implementation of a power tool and bit holding system 400 including a power tool 410 and a side bit holder 420. The power tool 410 is substantially the same as the power tool 110 of the system 100 in FIGS. 1A-1D. The side bit holder 420 comprises an elongated generally rectangular bar 422 and a central boss 424 with a hole 426. The bar 422 includes a plurality of recesses 430 configured to releasably retain a plurality of tool bits 432 via frictional engagement. The side tool bit holder 420 is configured to be removably coupled opposite lateral sides 419 of a base 417 of the power tool 410 by using a threaded fastener 428 (e.g., a screw) that engages a threaded bore on the base 417 of the power tool 410. The fastener 428 may be the same or similar to a fastener that can otherwise be used to attach a belt clip 434 to a lateral side 419 of the base 417 of the power tool 410. Thus, the side bit holder 420 and the belt clip 434 may be interchangeably coupled to a lateral side 419 of the base 417 of the power tool 410. In other implementations, the side bit holder 420 may be coupled to one lateral side 419 of the base 417 while the belt clip 434 is coupled to the opposite lateral side 419 of the base 417 (e.g., as shown in FIGS. 4C and 4D). In other implementations, ends of the bit holder bar may include engagement members (e.g., dovetails) configured to engage corresponding recesses in a tool bit container, such as the one shown in U.S. Pat. No. 6,213,296, which is hereby incorporated by reference.

Figure 5A:
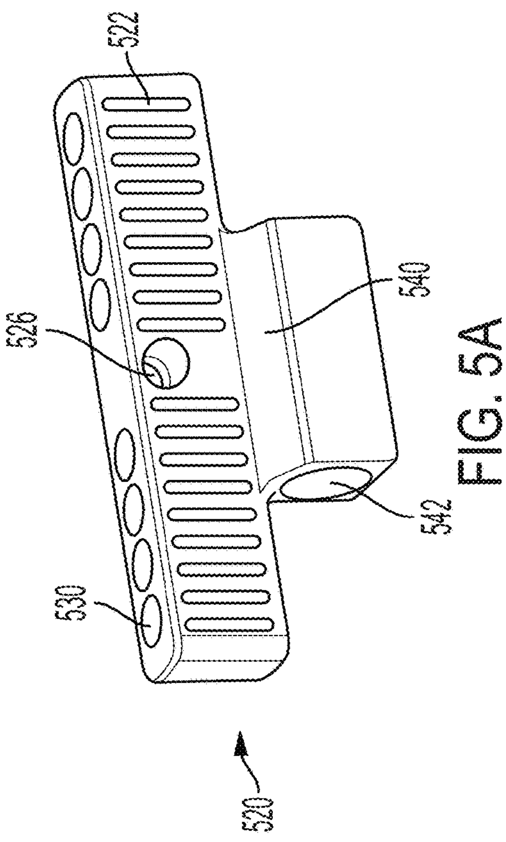
FIGS. 5A-5E are perspective views of another implementation of a power tool and bit holding system.
Figure 5B:
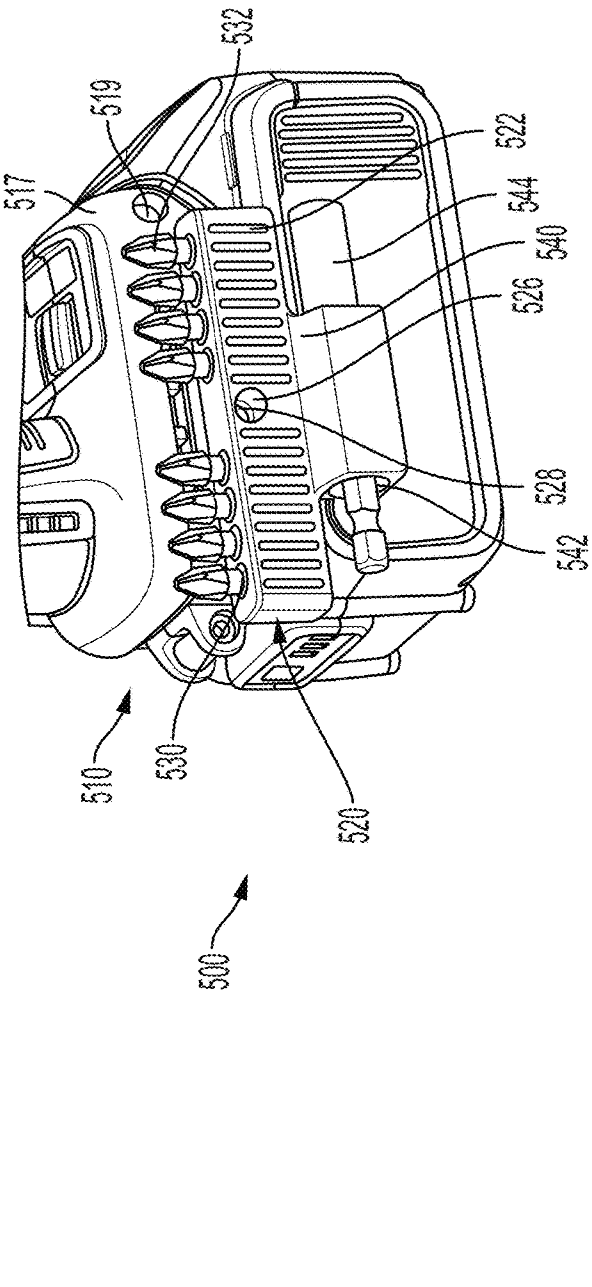
Figure 5E:
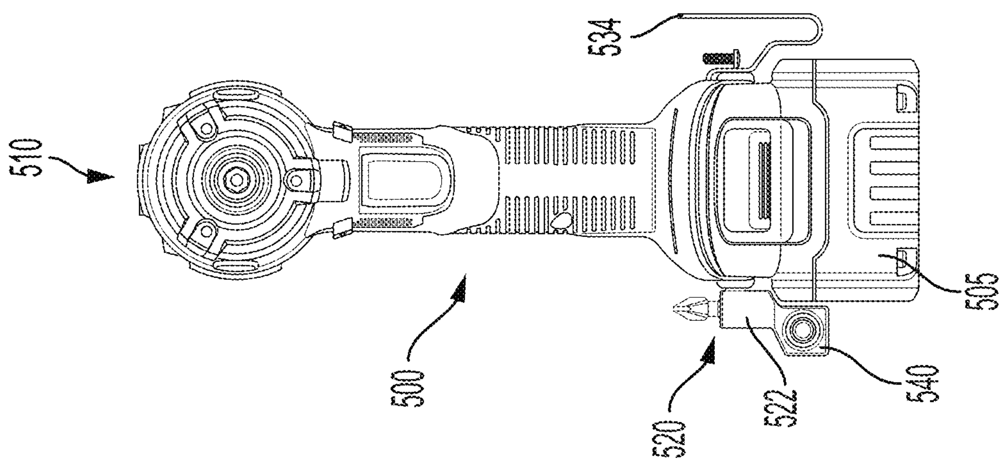
Figure 5D:
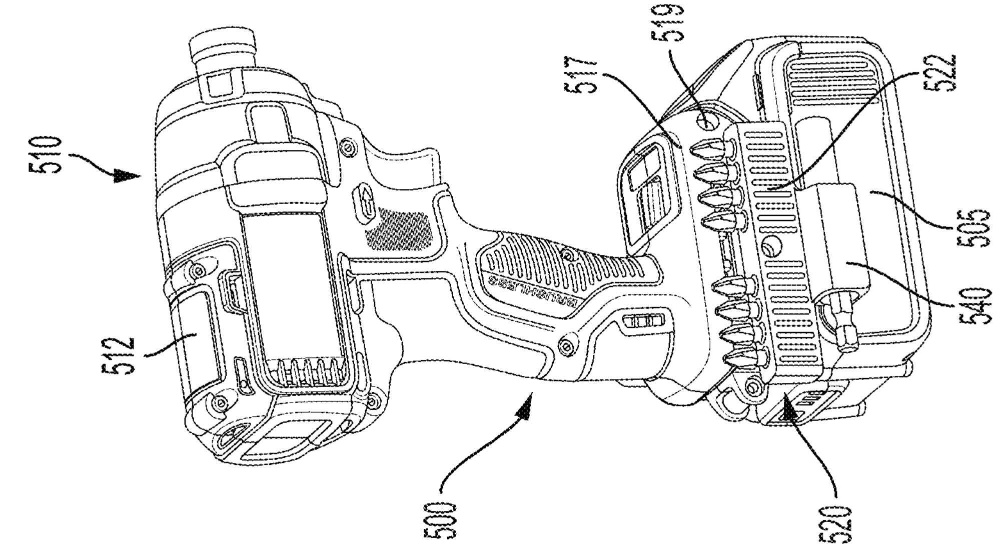
Figure 5C:
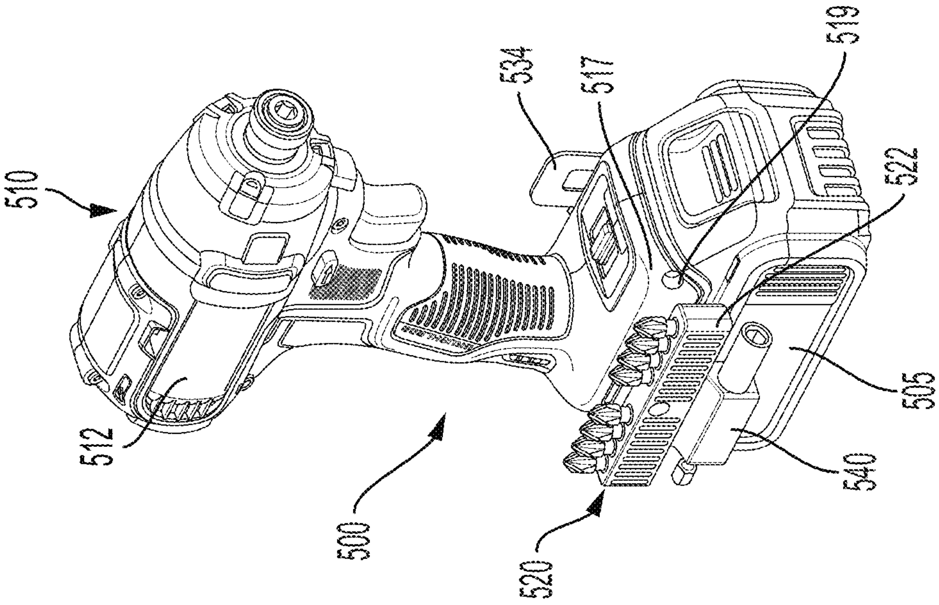

FIGS. 5A-5E illustrate another implementation of a power tool and bit holding system 500 including a power tool 510 and a side bit holder 520. The power tool 510 is substantially the same as the power tool 110 of the system 100 in FIGS. 1A-1D. The side bit holder 520 is substantially the same as the side bit holder 420 in FIGS. 4A-4D with the following differences. The side bit holder 520 includes an elongated generally rectangular bar 522, a hole 526, and a plurality of recesses 530 configured to releasably retain a plurality of tool bits 532 via frictional engagement. Unlike the side bit holder 420, the side bit holder 522 additionally includes a flange 540 coupled to a bottom of the bar 522 with an axial opening 542 configured to receive at least one of a supplemental tool bit holder 544 (e.g., a drive guide, as shown, or a quick release bit holder), a tool bit, or a fastener. The flange 540 is positioned below and laterally outward from the bar 522 and is adjacent a portion of a battery pack 505 coupled to the power tool 510. Like the side tool bit holder 420, the side tool bit holder 520 is configured to be removably coupled opposite lateral sides 519 of a base 517 of the power tool 510 by using a threaded fastener 528 (e.g., a screw) that engages a threaded bore in the base 517 of the power tool 510. The fastener 528 may be the same or similar to a fastener that can otherwise be used to attach a belt clip 534 to a lateral side 519 of the base 517 of the power tool 510. Thus, the side bit holder 550 and the belt clip 534 may be interchangeably coupled to a lateral side 519 of the base 517 of the power tool 510. In other implementations, the side bit holder 520 may be coupled to one lateral side 519 of the base 517 while the belt clip 534 is coupled to the opposite lateral side 519 of the base 517 (e.g., as shown in FIGS. 5C-5E). In other implementations, ends of the side bit holder bar 522 may include engagement members (e.g., dovetails) configured to engage corresponding recesses in a tool bit container, such as the one shown in U.S. Pat. No. 6,213,296.

Figure 6B:
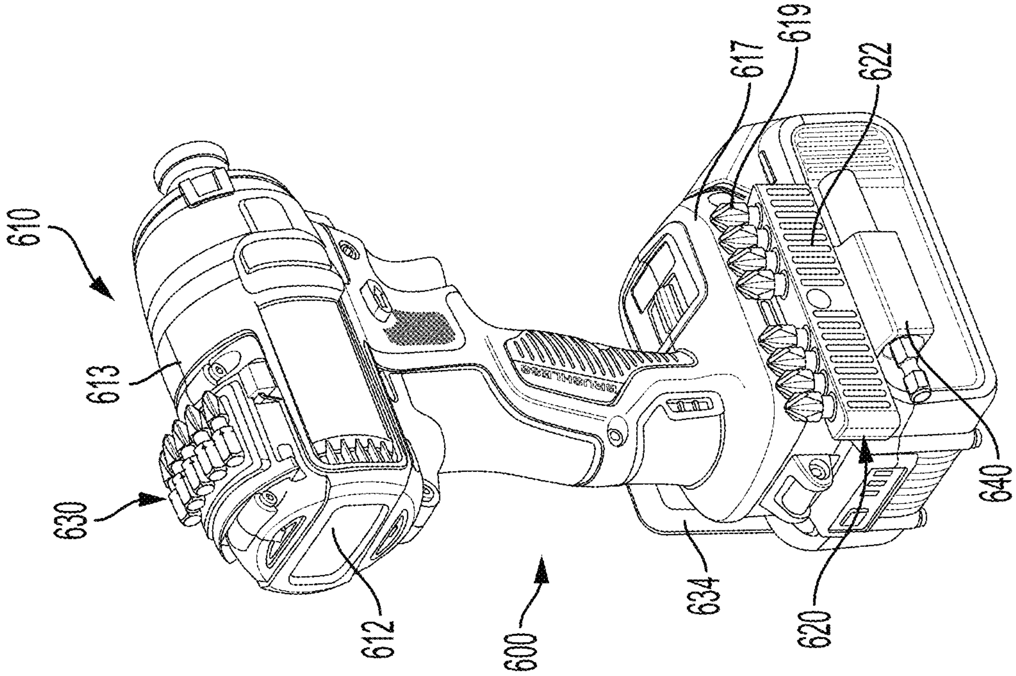
FIGS. 6A-6B are perspective views of another implementation of a power tool and bit holding system.
Figure 6A:
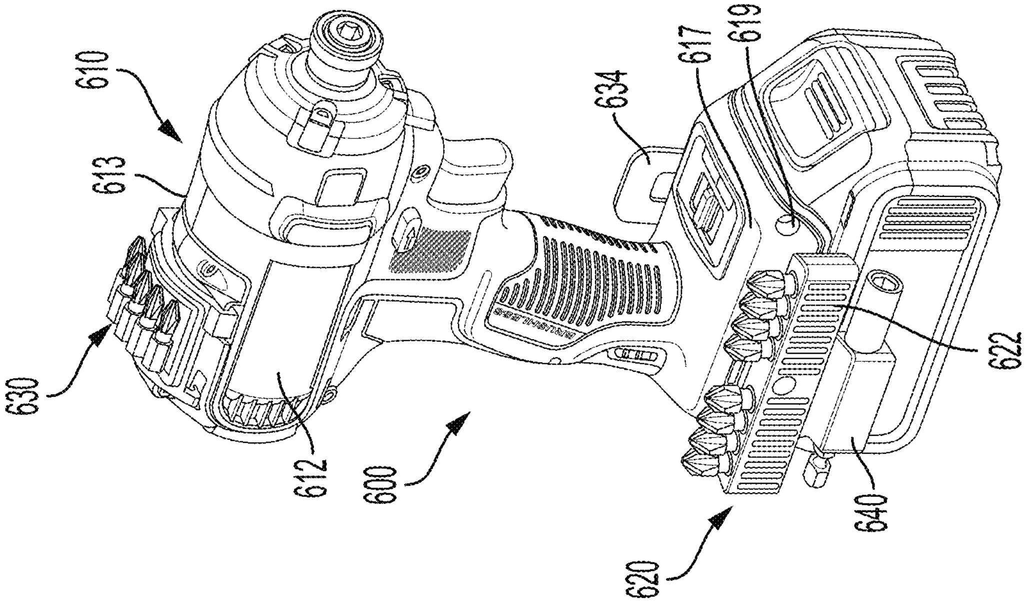
Figure 7B:
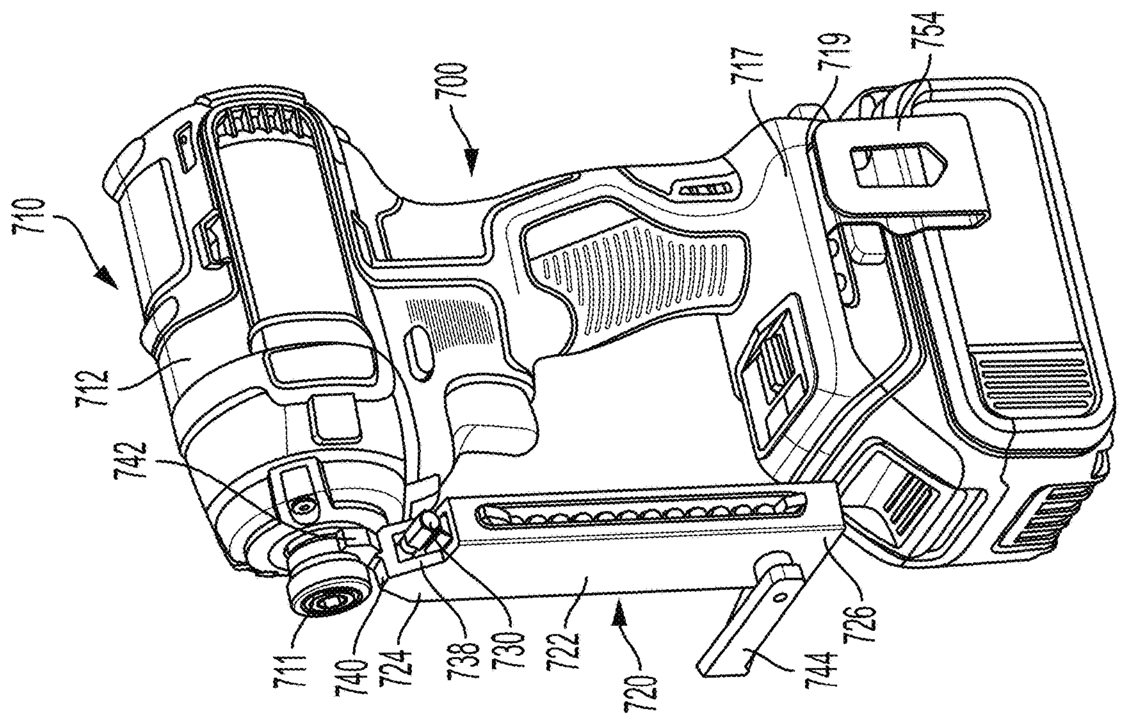
FIGS. 7A-7E are perspective views of another implementation of a power tool and bit holding system.
Figure 7A:
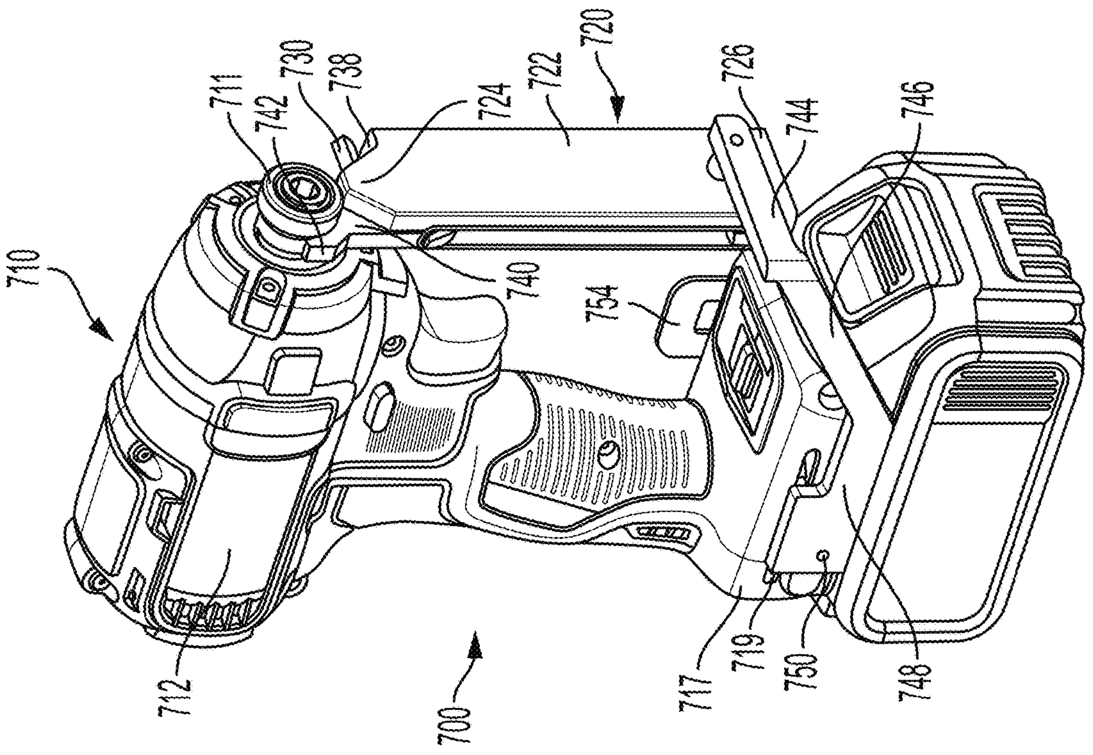
Figure 7D:
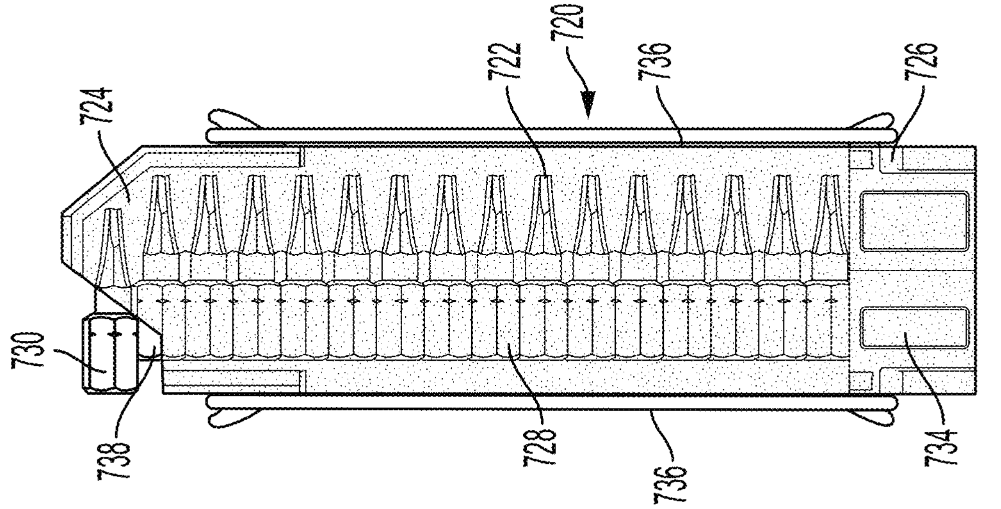
Figure 7C:
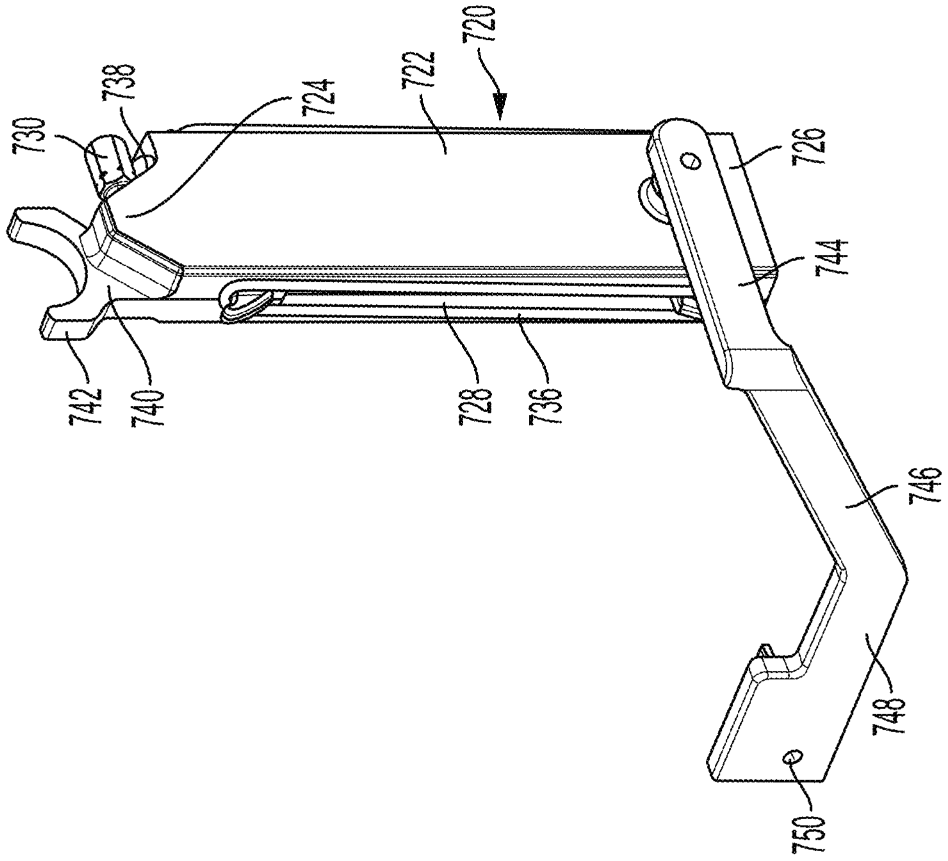
Figure 7E:
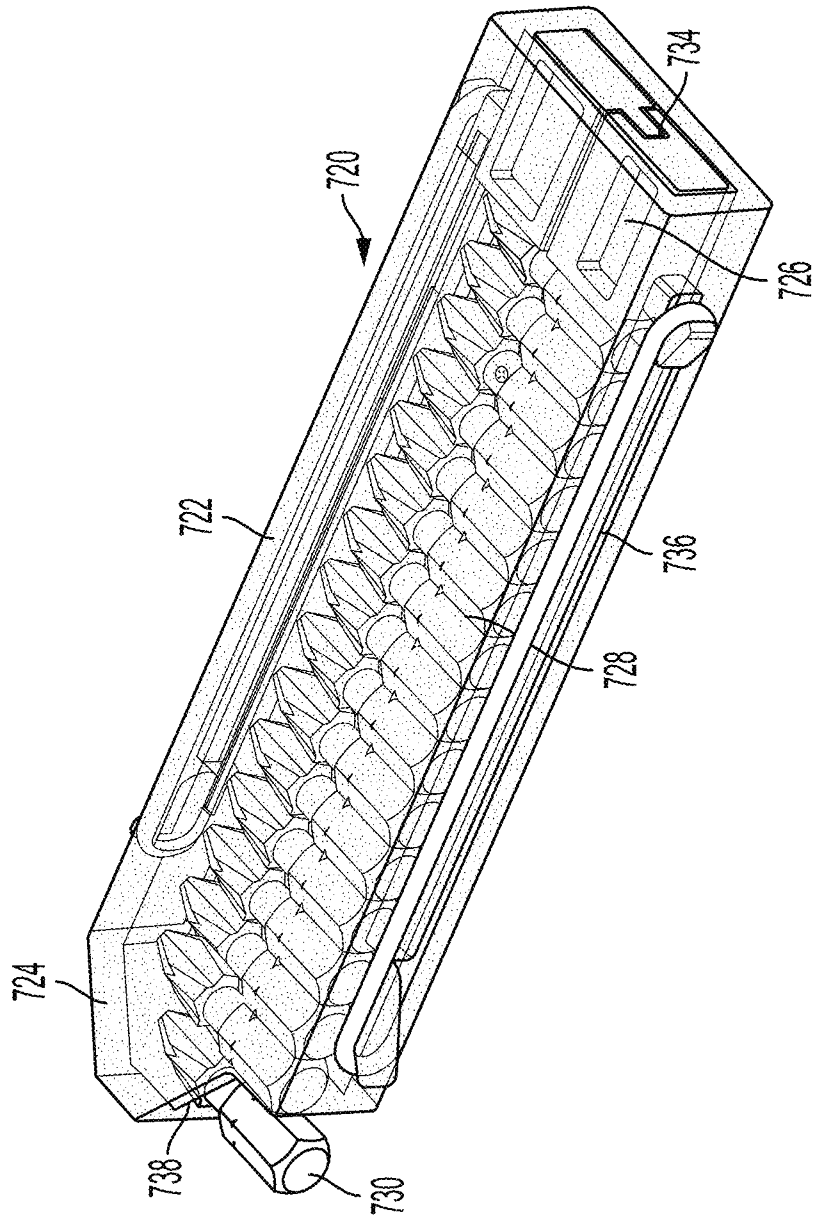
Figure 7F:
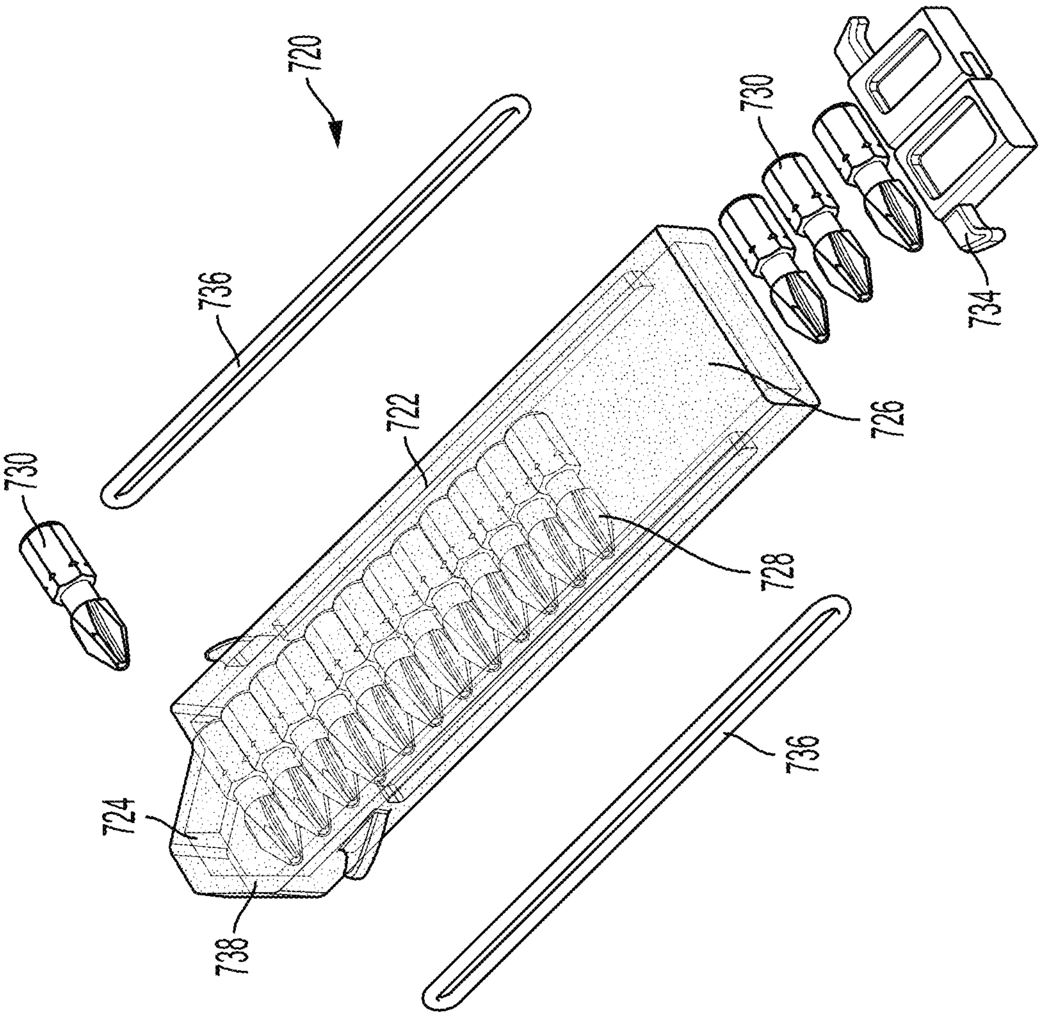
FIG. 7F is an exploded view of the bit holder of the system of FIGS. 7A-7E.

FIGS. 6A-6B illustrate another implementation of a power tool and bit holding system 600 including a power tool 610, a snap-on bit holder 620, and a side bit holder 630. The snap-on bit holder 610 is substantially the same as the snap-on bit holder 220. The side bit holder 630 is substantially the same as side bit holder 520. In the illustrated implementation, the snap-on bit holder 610 is coupled to a top surface 613 of a housing 612 of the power tool, the side bit holder 620 is coupled to one lateral side 619 of a base 617 of the power tool 610, and a belt clip 634 is coupled to an opposite lateral side 619 of the base 617 of the power tool 610.

FIGS. 7A-7F illustrate another implementation of a power tool and bit holding system 700 including a power tool 710 and a front bit holder 720. The power tool 710 is substantially the same as the power tool 110 of the system 100 in FIGS. 1A-1D. The front bit holder 720 includes a generally rectangular container 722 having a top end 724 and a bottom end 726. The housing 722 includes an elongated receptacle 728 configured to receive a plurality of tool bits 730 and a plunger 734 configured to press the tool bits 730 toward the top end 724 of the container 722. One or more springs, rubber bands, or O-rings 736 are configured to bias the plunger 734 toward the top end 724 of the container 722. The top end 724 includes a lateral opening 738 in communication with the elongated receptacle 728. The lateral opening 738 enables one tool bit at a time to be dispensed from or loaded into the receptacle.

The front bit holder 720 further includes a top support bracket 740 coupled to the top end 724 of the container 722 and a bottom support bracket 744 coupled to the bottom end 726 of the container 722. The top support bracket 740 includes a generally U-shaped hook portion 742 configured to be received around or coupled to a nosepiece or primary tool bit holder 711 of the power tool 722. In other implementations, the support 741 may be configured to be removably coupled to or support an accessory received in the primary tool bit holder 711, such as a shear cutting accessory.

The bottom support bracket 744 includes an angled brace 746 and a rectangular bar 748 with a hole 750. The support bracket 744 is configured to be removably coupled to one lateral side 719 of a base 717 of the power tool 710 by using a threaded fastener (e.g., a screw) that engages a threaded bore in the base 717 of the power tool 710. The fastener may be the same or similar to a fastener that can otherwise be used to attach a belt clip 754 to a lateral side 719 of the base 717 of the power tool 710. Thus, the bottom support bracket 744 and the belt clip 754 may be interchangeably coupled to a lateral side 719 of the base 717 of the power tool 710. In other implementations, the side bit holder 720 may be coupled to one lateral side 719 of the base 717 while the belt clip 754 is coupled to the opposite lateral side 719 of the base 717. In additional implementations, the rectangular bar 748 may include a plurality of recesses configured to releasably retain a plurality of tool bits via frictional engagement, similar to the plurality of recesses 530 in the implementation shown in FIGS. 5A-5E. In further implementations, the container 722 may be integral with or otherwise coupled to one of the braces disclosed in U.S. Pat. No. 9,701,032, which is incorporated by reference.

Figure 8B:
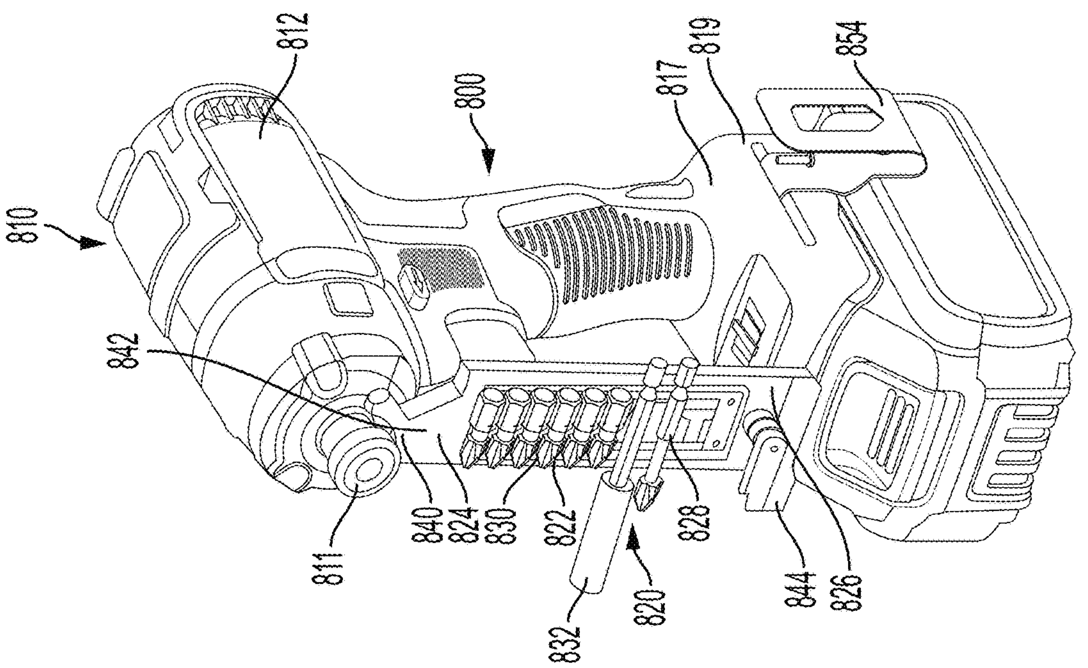
FIGS. 8A-8C are perspective views of another implementation of a power tool and bit holding system.
Figure 8A:
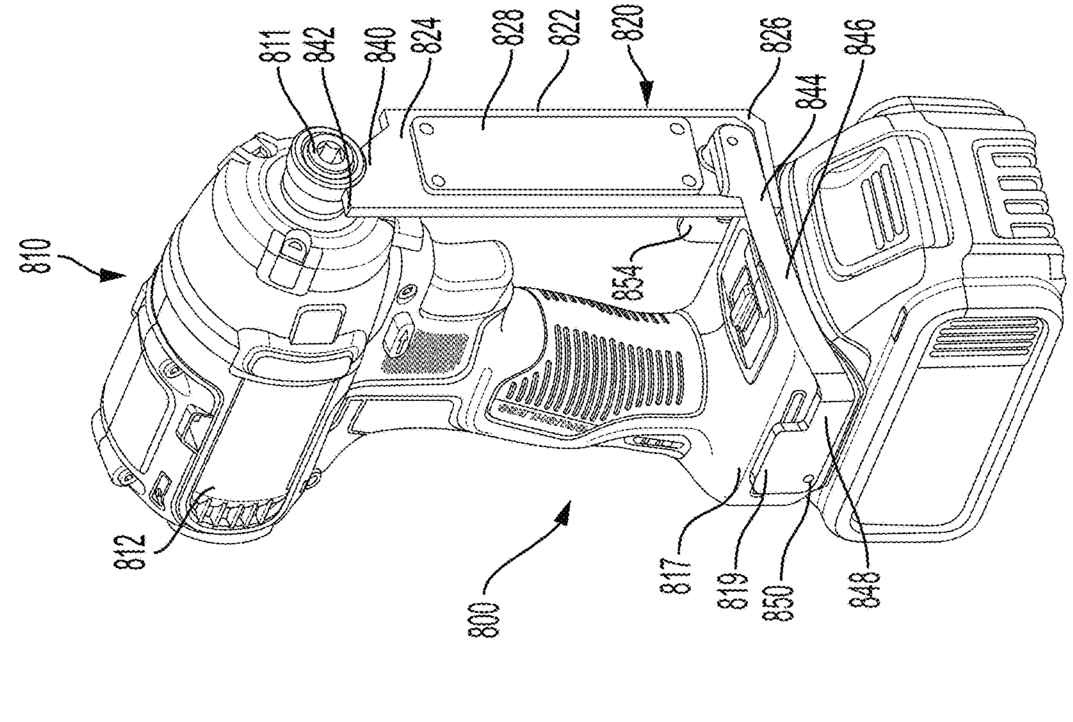
Figure 8C:
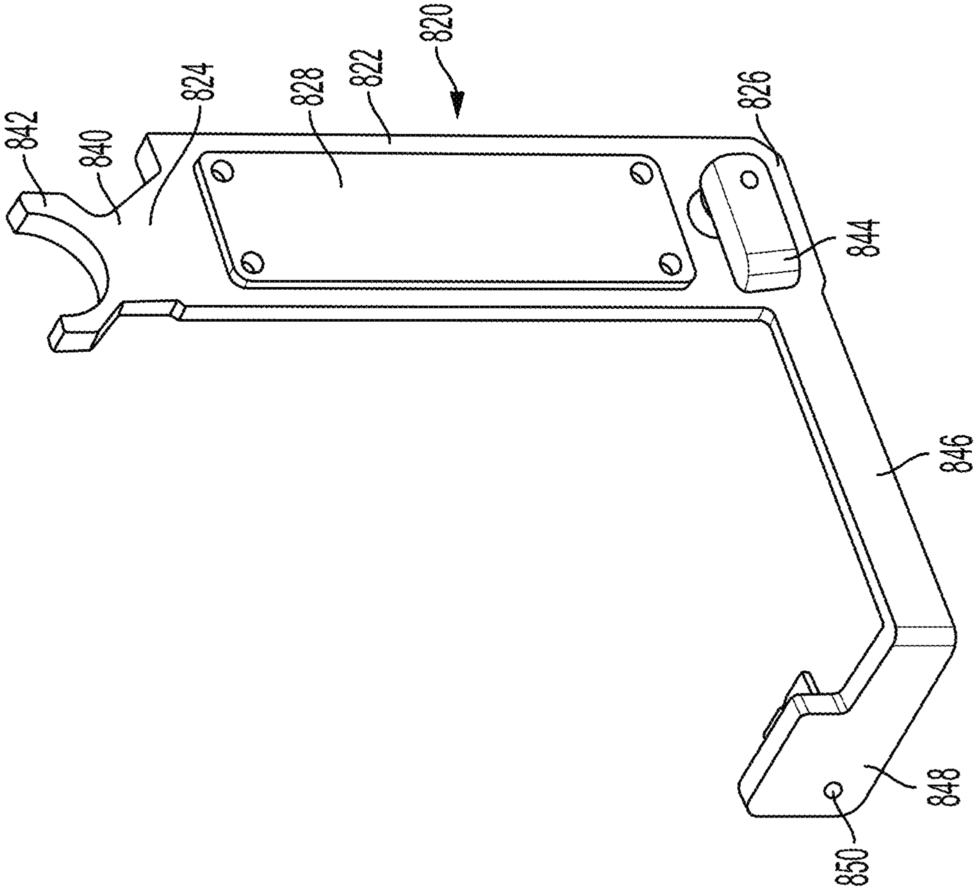

FIGS. 8A-8C illustrate another implementation of a power tool and bit holding system 800 including a power tool 810 and a front bit holder 820. The power tool 810 is substantially the same as the power tool 110 of the system 100 in FIGS. 1A-1D. The front bit holder 820 includes a generally rectangular plate 822 having a top end 824 and a bottom end 826. The plate 822 includes a generally rectangular magnetic surface 828 that is configured to magnetically receive and retain a plurality of tool bits 830 and/or supplemental tool bit holders 832.

The front bit holder 820 further includes a top support bracket 840 coupled to the top end 824 of the container 822 and a bottom support bracket 844 coupled to the bottom end 826 of the container 822. The top support bracket 840 includes a generally U-shaped hook portion 842 configured to be received around or coupled to a nosepiece or primary tool bit holder 811 of the power tool 822. In other implementations, the support 841 may be configured to be removably coupled to or support an accessory received in the primary tool bit holder 811, such as a shear cutting accessory.

The bottom support bracket 844 includes an angled brace 846 and a rectangular bar 848 with a hole 850. The support bracket 844 is configured to be removably coupled to one lateral side 819 of a base 817 of the power tool 810 by using a threaded fastener (e.g., a screw) that engages a threaded bore in the base 817 of the power tool 810. The fastener may be the same or similar to a fastener that can otherwise be used to attach a belt clip 854 to a lateral side 819 of the base 817 of the power tool 810. Thus, the bottom support bracket 844 and the belt clip 854 may be interchangeably coupled to a lateral side 819 of the base 817 of the power tool 810. In other implementations, the side bit holder 820 may be coupled to one lateral side 819 of the base 817 while the belt clip 854 is coupled to the opposite lateral side 819 of the base 817. In additional implementations, the rectangular bar 848 may include a plurality of recesses configured to releasably retain a plurality of tool bits via frictional engagement, similar to the plurality of recesses 530 in the implementation shown in FIGS. 5A-5E. In further implementations, the container 822 may be integral with or otherwise coupled to one of the braces disclosed in U.S. Pat. No. 9,701,032, which is incorporated by reference.

Example embodiments have been provided so that this disclosure will be thorough, and to fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known processes, well-known device structures, and well-known technologies are not described in detail.

The terminology used herein is for the purpose of describing particular example embodiments only and is not intended to be limiting. As used herein, the singular forms "a," "an," and "the" may be intended to include the plural forms as well, unless the context clearly indicates otherwise. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

When an element or layer is referred to as being "on," "engaged to," "connected to," or "coupled to" another element or layer, it may be directly on, engaged, connected or coupled to the other element or layer, or intervening elements or layers may be present. In contrast, when an element is referred to as being "directly on," "directly engaged to," "directly connected to," or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

Although the terms first, second, third, etc. may be used herein to describe various elements, components, regions, layers and/or sections, these elements, components, regions, layers and/or sections should not be limited by these terms. These terms may be only used to distinguish one element, component, region, layer or section from another region, layer or section. Terms such as "first," "second," and other numerical terms when used herein do not imply a sequence or order unless clearly indicated by the context. Thus, a first element, component, region, layer or section discussed below could be termed a second element, component, region, layer or section without departing from the teachings of the example embodiments.

Terms of degree such as "generally," "substantially," "approximately," and "about" may be used herein when describing the relative positions, sizes, dimensions, or values of various elements, components, regions, layers and/or sections. These terms mean that such relative positions, sizes, dimensions, or values are within the defined range or comparison (e.g., equal or close to equal) with sufficient precision as would be understood by one of ordinary skill in the art in the context of the various elements, components, regions, layers and/or sections being described.

Numerous modifications may be made to the exemplary implementations described above. These and other implementations are within the scope of this application.

What is claimed is:

1. A tool bit holding system for a power tool comprising:

a snap-on bit holder including a curved plate contoured similar to a contour of a top surface of a power tool housing and configured to removably rest on the top of the power tool housing; a plurality of legs extending from lateral ends of the curved plate, each leg including a hook portion configured to be removably received in recesses in lateral sides of the power tool housing to removably retain the curved plate on the top surface of the power tool housing; and a bit holding portion including at least one of a magnetic plate, a box, and one or more bit receiving slots coupled to a top face of the curved plate, wherein the at least one of the magnetic plate, the box, and the one or more bit receiving slots is configured to removably retain at least one of a tool bit, a fastener, and a supplemental tool bit holder, and a secondary bit holder including a bar with a plurality of bit receiving openings configured to be removably coupled to one side of a base of a handle that extends from the power tool housing by a threaded fastener that is otherwise used to couple a belt clip to the base when the bar is not coupled to the base.

2. The system of claim 1, wherein the curved plate comprises a semi-rigid member.

3. The system of claim 1, wherein each leg extends laterally outward from the curved plate.

4. The system of claim 3, wherein each hook portion comprises an L-shaped member.

5. The system of claim 1, wherein the bit holding portion includes the magnetic plate.

6. The system of claim 1, wherein the bar further includes a drop down extension including a recess configured to receive a supplemental tool holder.

7. The system of claim 1, wherein the bar is coupleable to the base by the threaded fastener received through a hole in the bar and into a threaded bore in the base.

8. The system of claim 7, wherein the threaded fastener and threaded bore are configured to alternatively couple a belt clip to the base in place of the bar.

9. A tool bit holding system for a power tool comprising:

a first bit holder including a curved plate contoured similar to a contour of a top surface of a power tool housing and configured to removably rest on the top of the power tool housing; a plurality of legs extending from lateral ends of the curved plate, each leg including a hook portion configured to be removably received in recesses in lateral sides of the power tool housing to removably retain the curved plate on the top surface of the power tool housing; and a bit holding portion coupled to the curved plate; and a second bit holder including a bar with a plurality of bit receiving openings configured to be removably coupled to one side of a base of a handle that extends from the power tool housing by a threaded fastener that is otherwise used to couple a belt clip to the base when the bar is not coupled to the base.

10. The tool bit holding system of claim 9, wherein the first bit holder is configured to snap onto the top surface of the power tool housing.

11. The tool bit holding system of claim 9, wherein the bit holding portion includes a magnetic surface coupled to the top plate.

12. The tool bit holding system of claim 11, wherein the bit holding portion further includes a slot configured to receive a supplemental tool bit holder.

13. The tool bit holding system of claim 12, wherein the slot extends generally parallel to an axis of the power tool housing.

14. The tool bit holding system of claim 9, wherein the bar is couplable to the base by the threaded fastener received through a hole in the bar and into a threaded bore in the base.

15. The tool bit holding system of claim 14, wherein the threaded fastener and threaded bore are configured to alternatively couple a belt clip to the base in place of the bar.

16. A tool bit holding system comprising:

a power tool including a housing defining an axis and a handle that extends from the housing to a base;

a first bit holder including a curved plate contoured similar to a contour of a top surface of the housing and configured to removably rest on the top of the housing; a plurality of legs extending from lateral ends of the curved plate, each leg including a hook portion configured to be removably received in recesses in lateral sides of the power tool housing to removably retain the curved plate on the top surface of the power tool housing; and a bit holding portion including a magnetic plate and a bit receiving slot coupled to a top face of the curved plate, the magnetic plate and the bit receiving slot configured to removably retain at least one of a tool bit, a fastener, and a supplemental tool bit holder; and a second bit holder including a bar with a plurality of bit receiving openings configured to be removably coupled to one side of a base of a handle that extends from the power tool housing, the bar being couplable to the base by a threaded fastener received through a hole in the bar and into a threaded bore in the base, wherein the threaded fastener and threaded bore are configured to alternatively couple a belt clip to the base in place of the bar.

* * * * *